United States Patent
Werner et al.

(10) Patent No.: US 10,377,172 B2
(45) Date of Patent: Aug. 13, 2019

(54) METHOD FOR THE PRODUCTION OF A VEHICLE WHEEL WITH A CONNECTION BETWEEN A WHEEL RIM AND A WHEEL DISC

(71) Applicant: THYSSENKRUPP CARBON COMPONENTS GMBH, Wilsdruff STT Kesselsdorf (DE)

(72) Inventors: Jens Werner, Coswig (DE); Christian Koehler, Dresden (DE); Sandro Maeke, Dohma (DE); Michael Dressler, Dresden (DE); Christian Heilmann, Dresden (DE); Florian Franke, Dresden (DE)

(73) Assignee: THYSSENKRUPP CARBON COMPONENTS GMBH, Wilsdruff STT Kesselsdorf (DE)

( * ) Notice: Subject to any disclaimer, the term of this patent is extended or adjusted under 35 U.S.C. 154(b) by 190 days.

(21) Appl. No.: 15/520,241

(22) PCT Filed: Oct. 27, 2015

(86) PCT No.: PCT/DE2015/100453
§ 371 (c)(1),
(2) Date: Apr. 19, 2017

(87) PCT Pub. No.: WO2016/066162
PCT Pub. Date: May 6, 2016

(65) Prior Publication Data
US 2017/0314604 A1 Nov. 2, 2017

(30) Foreign Application Priority Data

Oct. 27, 2014 (DE) .......................... 10 2014 115 591
Oct. 27, 2014 (DE) .......................... 10 2014 115 593

(51) Int. Cl.
| B60B 23/08 | (2006.01) |
| B60B 3/04 | (2006.01) |
| F16B 35/06 | (2006.01) |
| B60B 21/10 | (2006.01) |

(Continued)

(52) U.S. Cl.
CPC .............. B60B 23/08 (2013.01); B60B 3/041 (2013.01); B60B 21/102 (2013.01); F16B 35/06 (2013.01);

(Continued)

(58) Field of Classification Search
CPC ......... B60B 23/08; B60B 3/041; B60B 3/044; Y10T 29/49497; Y10T 29/49499
See application file for complete search history.

(56) References Cited

U.S. PATENT DOCUMENTS

| 1,802,773 A | 4/1931 | Nelson |
| 1,971,604 A | 8/1934 | Frank |

(Continued)

FOREIGN PATENT DOCUMENTS

| EP | 1858715 B1 | 11/2009 |
| GB | 195684 A | 4/1923 |

(Continued)

*Primary Examiner* — Jason L Vaughan
(74) *Attorney, Agent, or Firm* — thyssenkrupp North America, Inc.

(57) ABSTRACT

Disclosed is a method for producing a vehicle wheel with a connection between a wheel rim and a wheel disc in which the wheel disc is connected to the wheel rim by means of at least one connecting element that is guided through a through-hole of the rim base and is joined in the wheel disc. After the joining of the connecting element in the wheel disc a portion of the head of the connecting element projects beyond the rim base on the outer side of the rim. Subsequently the head of the connecting element is at least partially removed.

20 Claims, 4 Drawing Sheets

(51) Int. Cl.
 B60B 3/00 (2006.01)
 B60B 21/02 (2006.01)
(52) U.S. Cl.
 CPC ............ *B60B 3/001* (2013.01); *B60B 21/023* (2013.01); *B60B 2310/228* (2013.01); *B60B 2310/231* (2013.01); *B60B 2310/232* (2013.01); *B60B 2310/30* (2013.01); *B60B 2310/305* (2013.01); *B60B 2310/616* (2013.01); *B60B 2900/212* (2013.01); *B60B 2900/311* (2013.01)

(56) References Cited

U.S. PATENT DOCUMENTS

| | | | |
|---|---|---|---|
| 2,805,894 A | | 9/1957 | Gilbert |
| 4,599,781 A | * | 7/1986 | Diperstein ................ B23P 6/04 164/92.1 |
| 4,772,189 A | * | 9/1988 | Garside ..................... F01C 1/22 29/888.012 |
| 4,775,156 A | * | 10/1988 | Thompson ............. A63B 53/04 473/328 |
| 4,877,249 A | * | 10/1989 | Thompson ............. A63B 53/04 473/349 |
| 6,374,493 B1 | * | 4/2002 | Howald .................. B23P 15/00 29/418 |
| 9,889,349 B1 | * | 2/2018 | Seluga ............... A63B 53/0466 |
| 2003/0080605 A1 | | 5/2003 | Coleman |
| 2004/0021365 A1 | | 2/2004 | Georgeff |
| 2008/0143171 A1 | | 6/2008 | Wilson |

FOREIGN PATENT DOCUMENTS

| | | |
|---|---|---|
| GB | 684821 A | 12/1952 |
| WO | 2010067383 A1 | 6/2010 |

\* cited by examiner

Schnitt A-A

METHOD FOR THE PRODUCTION OF A VEHICLE WHEEL WITH A CONNECTION BETWEEN A WHEEL RIM AND A WHEEL DISC

BACKGROUND OF THE INVENTION

1. Field of the Invention

The invention relates to a vehicle wheel with a wheel rim and a wheel disc, whereby the wheel disc is connected to the wheel rim by means of at least one connecting element that is guided in a passage in the rim base and is joined in the wheel disc.

The invention also relates to a method for producing the connection between the wheel rim and the wheel disc of the vehicle wheel.

The vehicle wheel is used for all types of motorised vehicles, in particular as a lightweight-construction vehicle wheel for passenger cars and motorcycles.

The wheel disc may be designed as a wheel spider with spokes (spoke wheel) or as a largely closed-surface wheel disc.

2. Discussion of Background Information

One device of this type is known from the printed publication US 2004/0021365 A1. With this vehicle wheel a star-shaped wheel disc (wheel spider, spoke unit) is joined to the wheel rim by means of several connecting elements which are designed as countersunk blind rivets or countersunk bolts.

The connecting elements lead from the rim outer side of the wheel rim through—in each case—one through-hole in the well of the rim base and, on the inner side of the rim, are riveted or screwed to the adjacent spoke unit.

The connecting elements, in order to facilitate the fitting of the tire, have a head which has a very flat design and in the joined state is arranged recessed, largely flush with the contour of the rim base on the outer side of the rim.

The countersunk blind rivets consist—for the purpose of connecting deformation—of soft material, so that with these connecting elements specifically only small forces can be transmitted. In addition, after their installation, notching fracture points remain in the countersunk head from the detached rivet mandrel.

The countersunk bolts each have, for their installation, an auxiliary geometry for the installation tool to engage with, which is designed as a hexagon socket in the countersunk head.

These countersunk bolts are weakened in their cross section through the integrated auxiliary geometry. The tapering of the cross section of the connecting element in the area of the head let into the rim base reduces the forces that can be transmitted with the connecting element, which weakens the connection particularly under the continuous load acting on the vehicle wheel.

Over and above this, this auxiliary geometry of the countersunk bolts, like the rivet mandrel fracture point, generates a notching effect, which additionally reduces the strength of the connecting element.

This, in the event of large alternating loads, particularly with misuse loads, can lead to the premature breakage of the connecting element and thereby of the connection.

If—in order to counteract this—connecting elements with a larger cross section are used, this results in an undesirably larger space requirement for the connection in the rim base and to an undesirably greater vehicle wheel mass.

Furthermore, a large cross section, in particular of the head, regularly results in a contour projecting beyond the rim base, at least, however, to an inhomogeneous pattern of the contour of the rim base, which hampers the fitting of the tire and, over and above this, carries with it the danger of damaging the tire.

SUMMARY OF THE INVENTION

The problem underlying the invention is therefore to eliminate the disadvantages of the prior art and in particular to provide a method for the production of a vehicle wheel with which the reliability and durability of the connection between wheel rim and wheel disc is improved whilst at the same time keeping the mass input and space requirement low.

In order to solve the problem, it is provided that after the joining of the connecting element in the wheel disc has taken place, a portion of the head of the connecting element remains projecting beyond the rim base on the outer side of the rim and subsequently the head of the connection element is at least partially removed.

The connecting element can preferably be a screw, a bolt, a threaded rod or a rivet and be equipped with a head of any shape which usually has an auxiliary geometry for the installation of the connecting element.

With this method, after the joining of the connecting element in the wheel disc a portion of its head remains above the rim outer side of the rim base, whereby, subsequently, a part of the head of the connecting element can be removed through subsequent processing, which may for example be through cutting, milling or detachment along a predetermined breaking plane.

The removed part of the head can directly correspond to the portion of the head projecting on the outer side of the rim after joining or also comprise less or more than this portion.

Accordingly, the reduced part of the head remaining in the rim base can be partially or fully flush with the contour of the rim base on the outer side of the rim or project slightly beyond the contour of the rim base on the outer side of the rim.

With the method design the connecting element has, owing to the subsequent processing of the head, a flattened part of the head reduced only in its height which is still available to a sufficient degree for the transmission of force within the connection.

In every instance, through the method according to the invention a reduction of the mass in the completed connection is achieved without impairing the force-transmitting effect of the connection.

The invention also assumes that a portion of the head that remains projecting on the outer side of the rim after joining it not involved in the transmission of force by the connection.

Consequently at least a part of the auxiliary geometry integrated in or on the head and provided for the joining of the connection is also, per se, excluded from the flow of force and acts, to the benefit of the overall balance of force transmission, in a less weakening manner for the cross section and/or with a lower, inhomogeneous distribution of force.

Such an auxiliary geometry, onto or into which an installation tool is applied, may for example be a bar, a slot, a hexagonal socket or differently shaped Allen® recess in the connecting element.

In an advantageous design of the method, the connecting element is provided as part of a connection arrangement, whereby, after the joining of the connection arrangement in the wheel rim and the wheel disc, a portion of the connection arrangement remains projecting beyond the rim base on the outer side of the rim and subsequently the connection arrangement is at least partially removed.

In some cases of application, e.g. with a rim base made from fiber composite, in particular from carbon fiber-reinforced plastic, it is advantageous if, for the connection of the wheel disc to the wheel rim, a connection arrangement with at least one additional part accommodating the connecting element is provided.

For example, the connection arrangement can have a one- or multi-part bushing, lining the through-hole, in which the connecting element is mounted.

If, for the connection of the wheel disc to the wheel rim such a connection arrangement is provided, the connection according to the invention can advantageously be used for lightweight-construction wheel rims with a rim base made from weight-saving fiber composite, in particular from carbon fiber-reinforced plastic.

A bushing system separates the connecting element and— specific to the design—also the wheel disc from the rim base made from fiber composite. As a result, the relative movements between the rim base and the connecting element or the wheel disc are decoupled, by which means vibratory-rubbing wear on the fiber composite material and as the case may be also contact corrosion between the wheel rim made from fiber composite and a wheel disc made from other material can be avoided. In addition, better compatibility of the different thermal expansions of these components is achieved.

The present method according to the invention can also be applied to this connection design, whereby the above-mentioned advantages concerning the design with only one connecting element are likewise obtained.

With this method design, after the joining of the connecting element a portion of the connection arrangement remains above the rim outer side of the rim base. This projecting portion may consist solely of a projecting head section of the connecting element or be formed from a combination of the elements involved in the connection arrangement. Subsequently the parts of the connection arrangement undergo finishing, whereby these are removed individually or collectively piece by piece; here, too, this can take place for example by means of cutting, milling or detaching along a predetermined breaking plane.

The removed pieces of the connection arrangement may, in the same manner as the design with only one connecting element, directly correspond to the portion of the connection arrangement projecting on the outer side of the rim after joining or also comprise less or more than this portion.

Accordingly, the remaining, reduced part of the connection arrangement remaining in the rim base may be partially or fully flush with the contour of the rim base on the outer side of the rim or project slightly beyond the contour of the rim base on the outer side of the rim.

In a preferred method design, the head of the connecting element or the connection arrangement is finished in a shaping manner, so that the connecting element or the connection arrangement is adapted so that its contour matches the contour of the rim base on the outer side of the rim.

The part of the head or connection arrangement to be finished exactly corresponds, in this case, to the particular portion of the head or the connection arrangement projecting beyond the contour of the outer side of the rim.

If the part of the connection arrangement to be finished consists of several elements, these are preferably finished in a shaping manner in one single operation in order to comprehensively reproduce the contour of the rim base on the outer side of the rim.

Through this shaping of the head of the connecting element or the connection arrangement, a mostly constant pattern of the rim base both in an axial direction and circumferentially around the cylindrical circumferential surface of the wheel rim is generated in which the connecting elements arranged distributed across the circumference are essentially integrated so as to match the contour.

With this method according to the invention, firstly a connection is created that ensures an unimpeded and damage-free fitting of the tire.

Secondly, this approach enables the connecting element or the connection arrangement to be integrated, largely regardless of its size, into any contoured area of the rim base, for example also in narrow contour areas e.g. in the transition zone between well and hump, or in the tire seat, without influencing the contour of the rim base.

No greater space requirement is needed, nor are design adaptations to the rim base to accommodate the connection.

Consequently, fewer connecting elements or connection arrangements with, however, a greater cross section, can be used, without the rim geometry having to be tailored to this involving a greater installation space and hence greater mass requirement.

Through the use of connecting elements or connection arrangements with a greater cross section, the forces transmittable with each connecting element increase, which results in higher efficiency and greater security of the connection.

As a result of the method according to the invention, a connection site exactly adapted to the contour of the rim base on the outer side of the rim is produced, which ensures an efficient and secure—in the long term—connection of the wheel rim to the wheel disc while having a low space and mass requirement.

In an alternative method design, the head of the connecting element or the connection arrangement is finished to make it level, meaning that the connecting element or the connection arrangement is at least partially flush with the contour of the rim base on the outer side of the rim or forms a recess in relation to the contour of the rim base on the outer side of the rim.

This approach enables the use of simple tools or machine tools, as a result of which the method can be designed more cost-effectively. In particular, it is cost-effective to use in areas of the rim base, e.g. in the well, in which minor contour deviations on the contour on the outer side of the rim through the connection site are acceptable.

A practical approach provides that the head of the connecting element or the connection arrangement is finished by means of machining, preferably through turning, sanding or milling, on the contour of the rim base on the outer side of the rim.

Machining is particularly suitable when used on the rotationally symmetrical wheel rim. In this way the parts of the connecting elements or connecting arrangements to be finished can be finished with little effort and expense. The machining tool can be guided step-by-step or steadily around the wheel rim circumference and thus easily reach all parts of the connecting elements or the connection arrangements for machining.

In addition, with the machining of the connecting elements or the connection arrangements, particularly high dimensional accuracy is achieved in the surface formation, which is advantageous for the sensitive adaptation of the connection site to the contour of the rim base on the outer side of the rim.

One advantageous design of the method provides that the head of the connecting element or a radially extended portion of the connection arrangement is at least partially let into a recess, corresponding to it in a form-fit manner, of the through-hole.

The radially extended portion of the connection arrangement may for example, in addition to the head of the connecting element, comprise an edge of a bushing part extended on the outer side of the rim.

After the insertion and finishing of the connecting element or the connection arrangement, the remaining, let-in part of the head of the connecting element or of the radially extended edge of the connection arrangement is secured—in both a form-fit and force-fit manner—in the recess of the through-hole acting as a bearing.

This design is achievable with little design-related and technological effort or expense and ensures, despite the material-minimising finishing of the connecting element or of the connection arrangement, a secure force-transmitting effect of the connection, in particular a securing, supported in a form-fit manner, of the high preload force of the connecting element under the dynamic alternating loads to which the vehicle wheel is subjected.

Preferably, during the finishing of the head of the connecting element or of the connection arrangement, the auxiliary geometry of the connecting element or connection arrangement provided for joining the connection is completely removed.

The auxiliary geometry of the connection arrangement may for example, alongside a bar, a slot, a hexagonal socket or a differently shaped Allen recess in the connecting element, additionally be a serration in the edge of a bushing part on the outer side of the rim.

With this method design, the auxiliary geometry is, after the insertion of the connecting element or the connection arrangement, located outside of the contour of the rim base on the outer side of the rim, in particular in the part of the head of the connecting element or of the connection arrangement to be removed.

Thus the auxiliary geometry is completely removed in a simple manner during the processing of the connecting element or the connection arrangement and thereby the notching, cross-section-reducing influence of the auxiliary geometry on the connection excluded.

Through the removal of the auxiliary geometry, any cross-section constrictions, recesses reducing the cross section and notches on the connecting element or the connection arrangement are now completely avoided and thereby the force transmittable with the connecting element further increased, which improves the reliability and durability of the connection in the long term.

In addition, it becomes unnecessary to finish or even out the contour of the head in the area of the auxiliary geometry in order to achieve a connecting element integrated so as to give a perfectly constant contour. The removal of the auxiliary geometry and the integral adaptation to the continuous contour of the rim base are achieved in a single operation.

As a result, the previously described advantages can be achieved with the vehicle wheel produced in this manner and in the process a particularly highly secure connection be ensured.

In accordance with an advantageous design of the method, the finished head of the connecting element or the finished connection arrangement is covered with a coating layer.

With the coating layer, which for example is also used for the sealing of the surface of a rim base made from fiber composite on the outer side of the rim, the sealing of the tire chamber vis-à-vis the through-hole can be achieved with little effort and expense in a single operation together with the sealing of the rim base. In addition, the sealing of the tire chamber vis-à-vis the through-hole through the coating layer can be designed very reliably and, as the case may be, with a slight evening-out of the contour.

These and additional features coming from the patent Claims, the Description and the Drawings, can each be realised by themselves or in combination as advantageous embodiments of the invention.

BRIEF DESCRIPTION OF THE DRAWINGS

The method according to the invention is explained in more detail in the following embodiments. The associated drawings show the following in schematic representation FIG. 1 an extract of a cross-sectional view of a vehicle wheel in a first process step of the production of the connection between a wheel rim and a wheel spider in the well using flat-countersunk bolts as connecting elements, FIG. 2 an extract of a cross-sectional view of the vehicle wheel in a second process step of the production of the connection in accordance with FIG. 1, FIG. 2a an enlarged cross section A-A from the cross-sectional view of the vehicle wheel in accordance with FIG. 2, FIG. 3 an extract of a cross-sectional view of a vehicle wheel in a first process step of the production of the connection between a wheel rim and a wheel spider in the well using multi-part connection arrangements, FIG. 4 an extract of a cross-sectional view of the vehicle wheel in a second process step of the production of the connection in accordance with FIG. 3, FIG. 5 an extract of a cross-sectional view of a vehicle wheel in a first process step of the production of the connection between a wheel rim and a wheel spider in the transition zone from the well to the hump using flat-countersunk bolts as connecting elements, FIG. 6 an extract of a cross-sectional view of the vehicle wheel in a second process step of the production of the connection in accordance with FIG. 5.

DETAILED DESCRIPTION OF EMBODIMENTS

Figure 1:
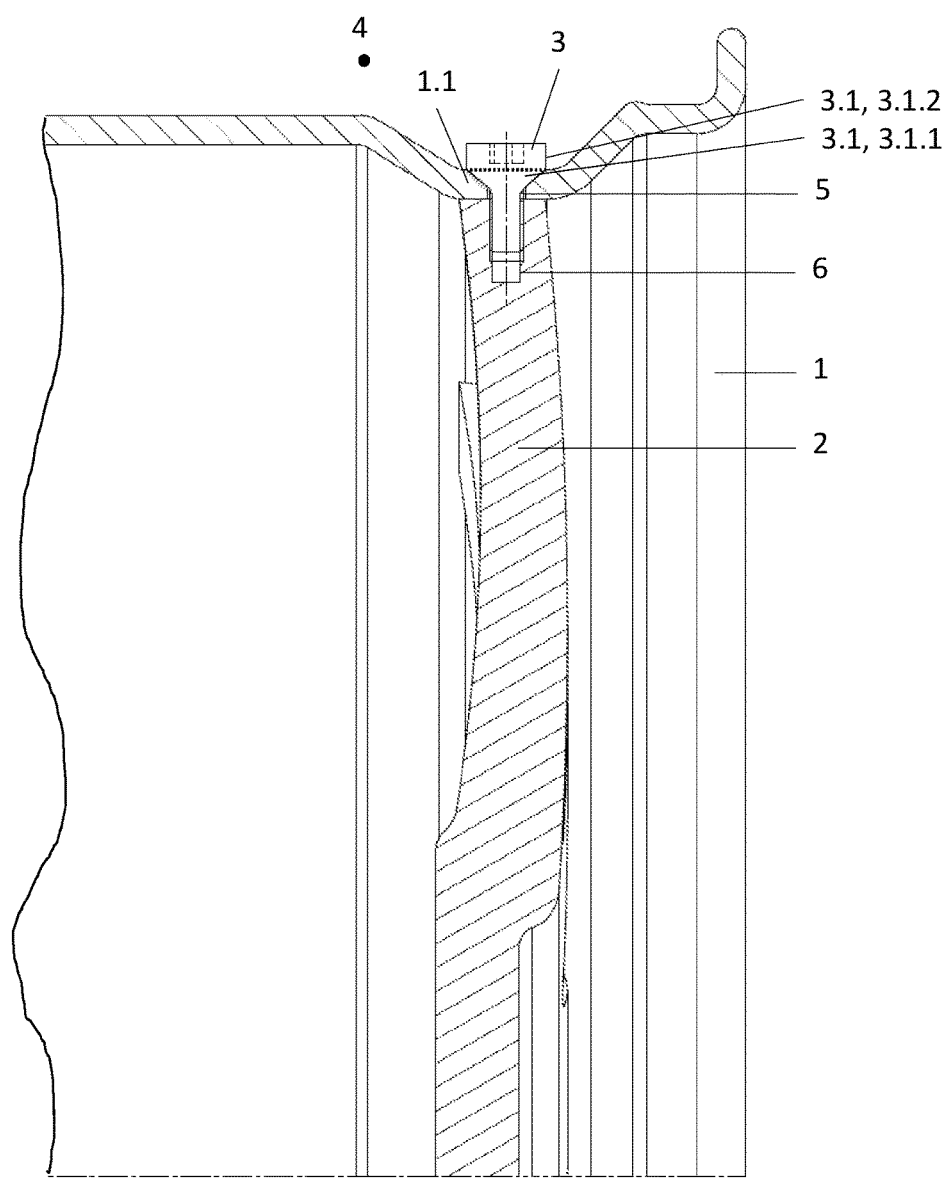
Figure 2:
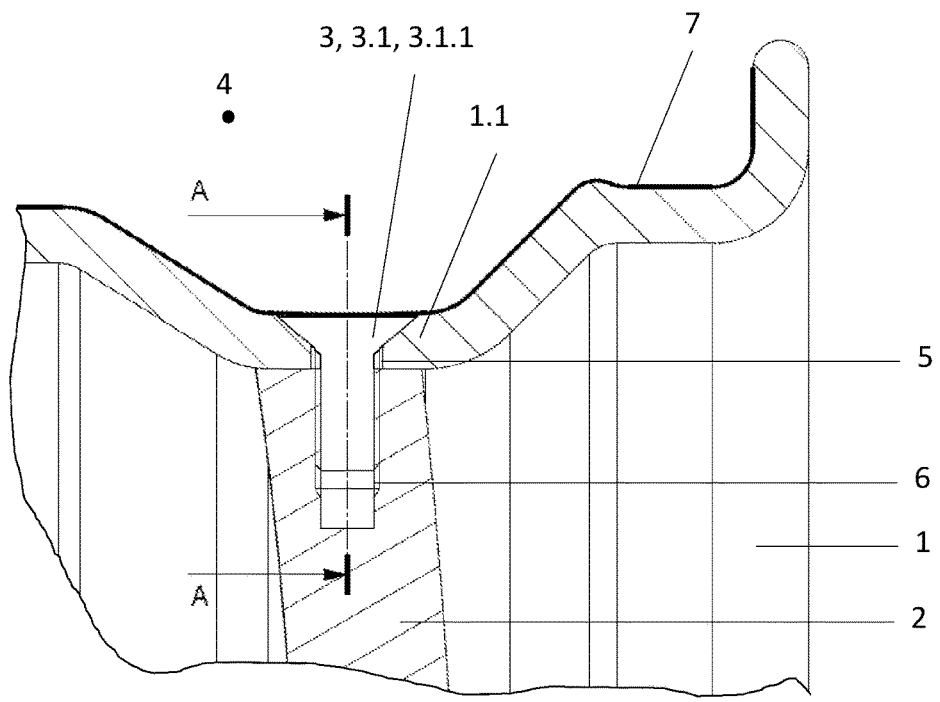

The first embodiment of the invention shows, in FIGS. 1 and 2, the method according to the invention for the production of the connection of a vehicle wheel from a wheel rim 1 and a wheel spider 2 made from aluminium using several flat-countersunk bolts 3 made from stainless steel arranged distributed around the circumference of the wheel rim as connecting elements. The sectional views show an extract of a cross section through the vehicle wheel along the longitudinal axis of one of the connecting elements 3.

The attachment of the wheel spider 2 to the wheel rim 1 takes place on the inner side of the rim in the area of the well 1.1 of the rim base of the wheel rim 1. On the outer side of the rim a tire chamber 4 of the vehicle wheel is adjacent to the rim base which (the chamber) is enclosed by a tube-less tire not shown.

The flat-countersunk bolt 3 has a large-sized, combined flat-countersunk head 3.1 with a lower, countersunk head portion 3.1.1 widened in a tapered manner and an adjacent flat-head portion 3.1.2, whereby in the flat-head portion 3.1.2 a hexagonal socket is formed as a recessed auxiliary geometry for the installation of the flat-countersunk bolt 3.

A through-hole 5 through the well 1.1 of the rim base has on the outer side of the rim a recess widened in a tapered manner (screwhole) which is intended to accommodate the countersunk portion 3.1.1. of the flat-countersunk head 3.1.

On the inner side of the rim, each of the through-holes 5 corresponds to one longitudinally extended blind hole 6, which extends into one spoke end of the wheel spider 2.

FIG. 1 shows, in a snapshot, a first process step according to the invention of the production of the connection of the vehicle wheel between wheel rim 1 and wheel spider 2 directly after the insertion of the flat-countersunk bolt 3.

The flat-countersunk bolt 3 is guided through the through-hole 5 and engages, with the external thread of its shaft end, with the internal thread of the blind hole 6.

The flat-countersunk bolt 3 is tightened using a socket wrench (not shown) which, for this purpose, engages with the hexagonal socket of the flat-countersunk head 3.1.

In the screwed-in state in accordance with FIG. 1, on the one hand the radial outer contour of the essentially radially extending wheel spider 2 is firmly attached to the contour of the well on the inner side of the rim and on the other hand a tapered contact surface of the countersunk head portion 3.1.1 of the flat-countersunk head 3.1 is pressed onto the corresponding screwhole in the rim base.

The upper flat-head portion 3.1.2 of the flat-countersunk head 3.1 remains, in the joined, screwed-in state of the flat-countersunk bolt 3, essentially above an imaginary, constantly continuous contour plane of the contour of the rim base on the outer side of the rim and essentially forms the portion of the flat-countersunk head 3.1 of the connecting element 3 projecting beyond the contour of the rim base on the outer side of the rim.

The hexagonal socket of the flat-countersunk head 3.1 is located, in the screwed-in state of the flat-countersunk bolt 3, above the contour of the well 1.1 on the outer side of the rim.

FIG. 2 shows, in a snapshot, a second process step of the production of the connection of the vehicle wheel in accordance with FIG. 1. In this process step, which followed the joining of the flat-countersunk bolt, 3 the vehicle wheel was processed further on a 3-axis milling machine, whereby all flat-countersunk heads 3.1 of the flat-countersunk bolts 3 inserted were milled level using a face-milling cutter tool.

Figure 2A:
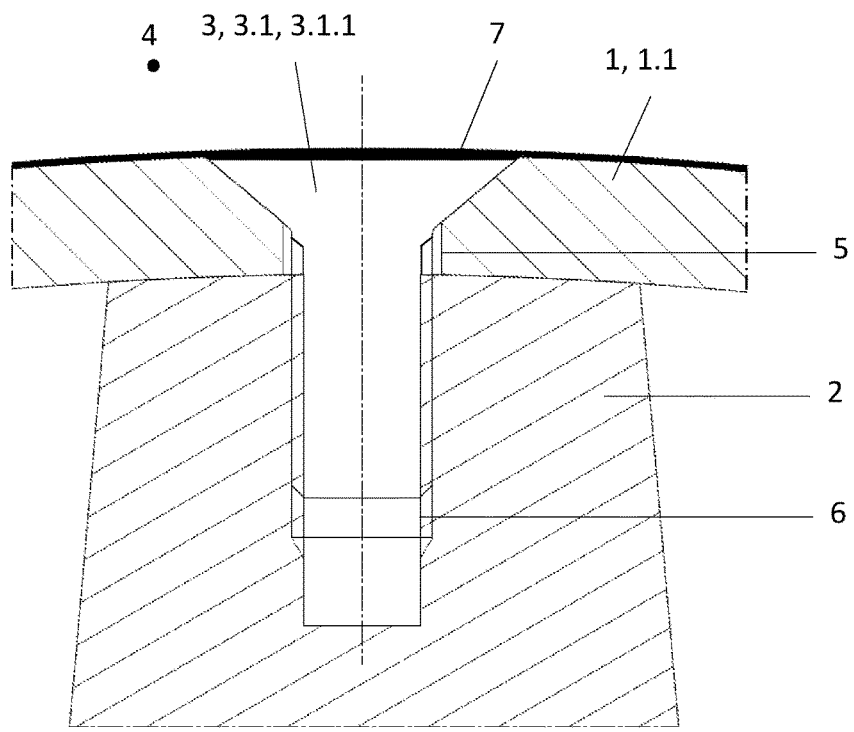

As is more accurately visible from the enlarged sectional view A-A in FIG. 2a, the flat-countersunk head 3.1 is milled level sufficiently so that it at least at no point protrudes beyond the circumferentially curved rim outer side of the well 1.1, so that damage during tire fitting can be largely avoided.

A projection-free design of the flat-countersunk head 3.1 is at least ensured by the fact that the edge of the flat-countersunk head 3.1, finished so as to be level, oriented in a tangential direction of the cylindrical circumferential surface of the rim base, is flush with the adjacent circumferential surface of the well 1.1.

To reliably exclude any projection of the remaining part of the flat-countersunk head 3.1, finished so as to be level, it is designed, as per FIG. 2a, by way of a precaution with a slight but complete recess vis-à-vis the curved rim outer side of the well 1.1.

Geometrically the result of this is that the surface of the flat-countersunk head 3.1, finished so as to be level, in relation to the contour of the well 1.1 on the outer side of the rim, is designed lower paraxially than on the edge radially, as is visible in FIG. 2a.

By removing a substantial part of the flat-countersunk head 3.1 a low-mass connection, with essentially minor rim base contour deviations in the area of the connection sites, is created.

In addition, without further assistance, the hexagonal socket of the flat-countersunk head 3.1 was removed along with it.

Hence the portion of the flat-countersunk head 3.1, finished according to the invention, remaining in the connection site, which essentially corresponds to the countersunk head portion 3.1.1, has a homogeneous full cross section, without a point of material weakness brought about by the auxiliary geometry, which substantially improves the force-transferring property of the connecting element 3 and achieves a particularly high-strength connection.

In a third process step indicated in FIGS. 2 and 2a, for the purpose of sealing off the through-hole 5 through the rim base vis-à-vis the tire chamber 4 the finished surface of the flat-countersunk head 3.1 and additionally the surface of the rim base on the outer side of the rim are covered with a thin coating layer 7. Here the coating layer 7 fills the recessed area above the flat-countersunk head 3.1 that is milled level and hence ensures an evening-out of the contour to the greatest possible extent.

Figure 3:
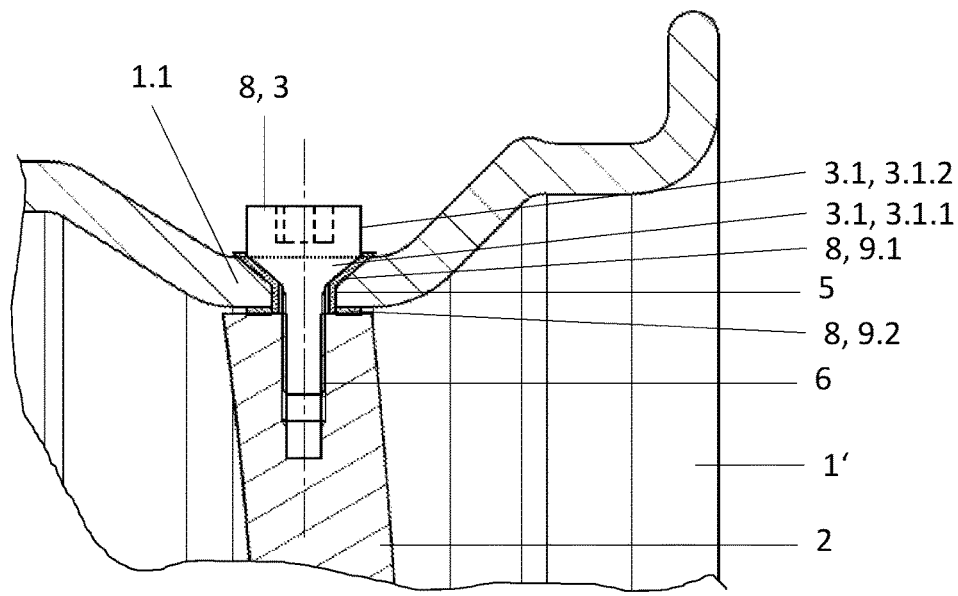
Figure 4:
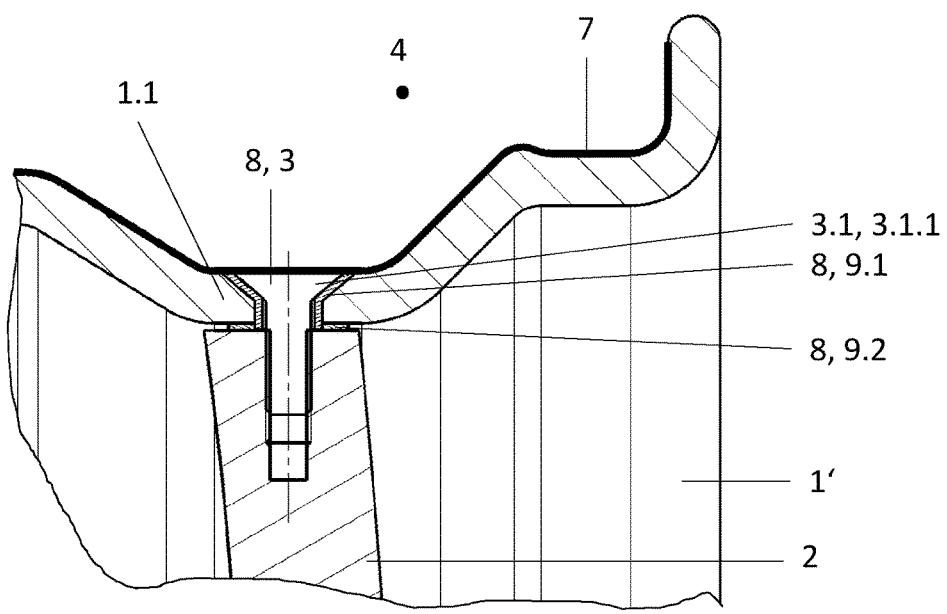

FIGS. 3 and 4 show, in a second embodiment, the method according to the invention for producing a vehicle wheel which consists of a wheel rim 1' made from fiber composite and a wheel spider 2 made from aluminium.

The connection takes place in area of the well 1.1 using several connection arrangements 8 arranged around the circumference of the wheel rim 1', in each case consisting of a flat-countersunk bolt 3 in accordance with FIGS. 1 and 2 and a two-part bushing 9. The sectional views show an extract of a cross section through the vehicle wheel along the longitudinal axis of the connection arrangement 8.

A first and a second bushing part 9.1, 9.2 of the two-part bushing 4 line the through-hole 5 through the rim base made from fiber composite.

The first bushing part 9.1 extends through the through-hole 5 and protrudes on the inner side of the rim beyond the rim base cross section of the well 1.1, whilst the second bushing part 9.2 surrounds the protruding part of the first bushing part 9.1 and contacts with the rim inner side of the well 1.1.

The first bushing part 9.1 has, on the outer side of the rim, a peripheral area widened in a tapered manner which is let into the recess (screwhole), widened in a tapered manner on the outer side of the rim, of the through-hole 5 and projects slightly beyond the surface of the rim base on the outer side of the rim.

The bushing parts 9.1, 9.2 create a protective separation of the flat-countersunk bolt 3 and the wheel spider 2 from the rim base of the wheel rim 1' made from fiber composite.

FIG. 3 shows a snapshot of a first process step for producing the connection of the vehicle wheel immediately after the insertion of the connection arrangement 8.

When screwing in the flat-countersunk bolt 3 the latter is, unlike the method in accordance with FIGS. 1 and 2, guided through the first and second bushing parts 9.1, 9.2 of the two-part bushing 9 and screwed into the blind hole 6 of the wheel spider 2.

In the screwed-in state in accordance with FIG. 3 the radial outer contour of the wheel spider 2 is pressed firmly onto the contact surfaces, on the inner side of the rim, of the first and second bushing parts 9.1, 9.2 and the tapered contact surface of the countersunk head portion 3.1.1 onto the corresponding peripheral area, widened in a tapered manner, of the first bushing part 9.1.

The upper flat-head portion 3.1.2 of the flat-countersunk head 3.1 of the bolt 3 and a part of the peripheral area, widened in a tapered manner, of the first bushing part 9.1 remain, in the screwed-in state, essentially above an imaginary, constantly continuous contour plane of the contour, on the outer side of the rim, of the well 1.1 and essentially forms the portion of the connection arrangement 8 projecting beyond the well 1.1. on the outer side of the rim.

The hexagonal socket arranged exclusively in the flat-head portion 3.1.2 is therefore, in the screwed-in state of the flat-countersunk bolt 3, thereby likewise located outside of the contour, on the outer side of the rim, of the well 1.1.

FIG. 4 shows in a snapshot the second process step, following the joining, of the production of the connection of the vehicle wheel in accordance with FIG. 3, in which the vehicle wheel was further processed on a 5-axis milling machine and the projecting portion of each of the connection arrangements 8 of the flat-countersunk heads 3.1 was removed by machining using a face-milling cutter tool.

The tool is guided in a radial direction along the circumference of the rim base, so that removal of the projecting portions of the connection arrangements 8 occurs in a way that follows the contour and the remaining portions of the connection arrangements let into the rim base, which essentially each correspond to the countersunk head portion 3.1.1 of the flat-countersunk head 3.1 with the let-in peripheral area of the first bushing part 9.1, are adapted to the contour of the rim base 1.1. on the outer side of the rim in a way that faithfully matches the contour.

At the same time, the hexagonal socket of the flat-countersunk head 3.1 is completely removed during the finishing of the projecting portion of the connection arrangement 8.

As a result, a universally constant pattern is generated for the contour, on the outer side of the rim, of the rim base in the area of the well 1.1 both in an axial extension and circumferentially around the cylindrical circumferential surface of the rim base, into which the adjacent connection arrangement 8 on the outer side of the rim, made up of flat-countersunk bolt 3 and first bushing part 9.1, is integrated without any contour discontinuities.

In a third process step indicated in FIG. 4, in order to seal off the through-hole 5 on the one hand and the rim base made from fiber composite on the other vis-à-vis the tire chamber 4, the finished surface of the connection arrangement 8 and the surface of the rim base on the outer side of the rim are continuously and in one operation covered with a thin coating layer 7.

With this method example, otherwise exactly the same advantages are obtained as described for the method example in accordance with FIGS. 1 and 2.

Figure 5:
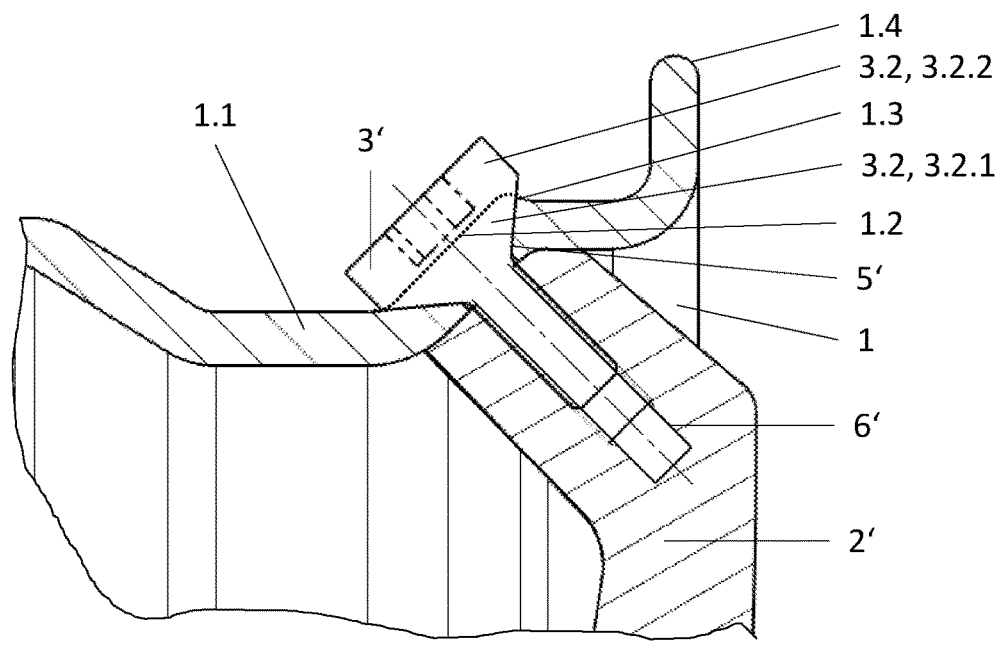
Figure 6:
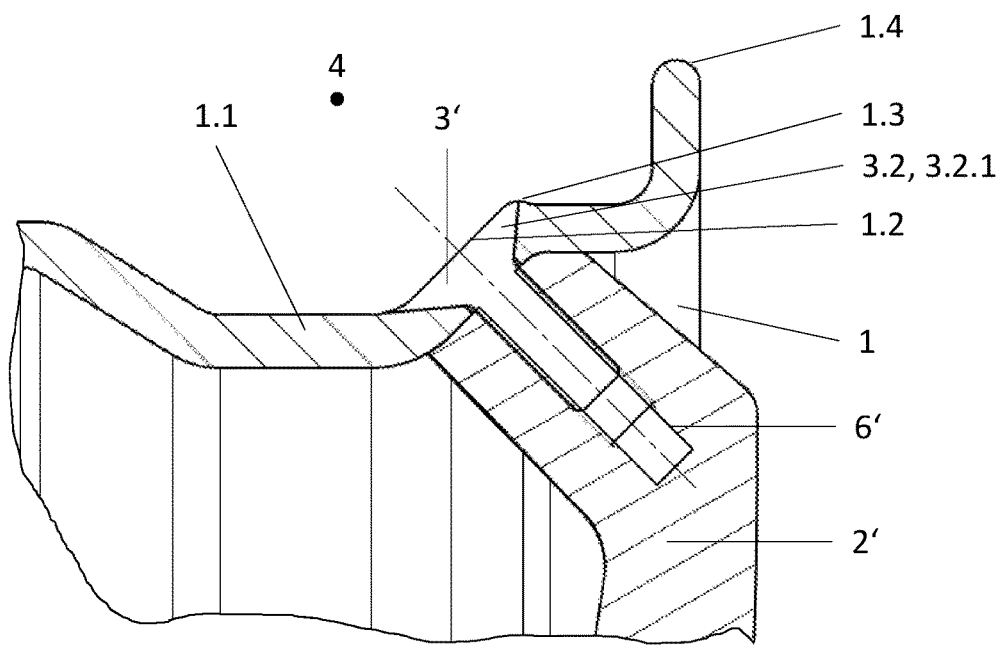

In a third embodiment, FIGS. 5 and 6 show the method according to the invention for producing the connection of the vehicle wheel to a wheel rim 1 according to the first embodiment in accordance with FIGS. 1, 2 and 2*a* and a wheel spider 2' with bent spoke ends made from aluminium, whereby the wheel rim 1 and the wheel spider 2' are connected to combined flat-countersunk bolts 3' arranged distributed over the circumference of the wheel rim 1, which are designed in a similar way to the previous embodiments.

The sectional views show an extract of a cross section through the vehicle wheel along the longitudinal axis of one of the connecting elements 3'.

Unlike the flat-countersunk bolt 3 according to the previous embodiments, the flat-countersunk bolt 3' used here has a larger cross section and a modified flat-countersunk head 3.2 whose countersunk head portion 3.2.1 is constructed significantly longer than the flat-head portion 3.2.2.

By way of a further difference from the preceding embodiments, the attachment of the wheel spider 2' to the wheel rim 1 takes place on the inner side of the rim in a diagonally running transition zone 1.2 between the well 1.1 and the rim shoulder (hump) 1.3 of the rim base of the wheel rim 1.

Accordingly each of the through-holes 5' is arranged perpendicular to this diagonally running transition zone 1.2 from the well 1.1 to the hump 1.3 and corresponds in each case to a blind hole 6' which extends in the bent spoke end of the wheel spider 2' lengthways.

The connection faces of the curved spoke ends of the wheel spider 2' are designed adapted to the contour, on the inner side of the rim, of the diagonal transition zone 1.2 from the well 1.1 to the hump 1.3.

Corresponding to the flat-countersunk head 3.2 the through-hole 5' has, to accommodate the countersunk head portion 3.2.1, a large recess (screwhole) widened in a tapered manner, which extends across a substantial length of the through-hole 5'.

FIG. 5 shows, in a snapshot, a first process step according to the invention of the production of the connection of this vehicle wheel immediately after the insertion of the flat-countersunk bolt 3'.

The flat-countersunk bolt 3' is guided through through-hole 5' and engages with its external thread with the internal thread of the blind hole 6'.

The countersunk head bolt 3' is tightened using a socket wrench (not shown) which engages with the hexagonal socket which is constructed in the flat-head portion 3.2.2 of the flat-countersunk head 3.2.

In the screwed-in state in accordance with FIG. 5, the connecting faces of the curved spoke ends of the wheel spider 2' are firmly pressed onto the contour, on the inner side of the rim, of the diagonal transition zone 1.2 and the tapered contact surface of the countersunk head portion 3.2.1 of the flat-countersunk head 3.2 firmly pressed onto the corresponding screwhole.

The upper flat-head portion 3.2.2 of the flat-countersunk head 3.2 remains, in the joined, screwed-in state of the flat-countersunk bolt 3', essentially outside of the imaginary, continuous contour plane of the contour, on the outer side of the rim, of the rim base in the transition zone 1.2 from the well 1.1 to the hump 1.3 and essentially forms the portion of the connecting element 3' projecting beyond the contour of the rim base 3' on the outer side of the rim.

The hexagonal socket of the flat-countersunk head 3.1 is located in the flat-head portion 3.2.2 and hence, in the screwed-in state of the flat-countersunk bolt 3', outside of the contour, on the outer side of the rim, of the rim base in the transition zone 1.2.

FIG. 6 shows, in a snapshot, a second process step of the production of the connection of the vehicle wheel in accordance with FIG. 5.

In this process step following the joining of the flat-countersunk bolt 3', the projecting portions of the flat countersunk head 3.2 are removed using a ball cutter or roughing cutter tool of a 5-axis milling machine.

The tool is both guided in a radial direction along the circumference of the rim base and can also be pivoted sideways in an axial direction, so that a contour-faithful pattern of the flat-countersunk heads 3.2 to be removed can also be produced on the transition radii of the transition zone 1.2.

The remaining portions, let into the rim base, of the flat-countersunk heads 3.2, which essentially each correspond to the countersunk head portion 3.2.1, are thereby adapted—so as to match it faithfully—to the contour, on the outer side of the rim, of the transition zone 1.2 from the rim base 1.1 to the hump 1.3. Here the finished contour of the remaining portions of the flat-countersunk heads 3.2 also forms a part of the contour of the rim base 1.1 and of the hump 1.3.

With the finishing, in a shaping manner, of the flat-countersunk heads of the connecting elements 3', in each case the hexagonal socket of each flat-countersunk head 3.2 is completely removed.

As a result, the finishing of the flat-countersunk head 3.1 generates a constant pattern of the rim base in the transition zone 1.2 between well 1.1 and hump 1.3 both in an axial extension and also circumferentially around the cylindrical circumferential surface of the rim base.

With this method example it is shown in particular that connecting elements with a large cross section and high force-transferring properties, like the flat-countersunk head bolt 3', can also be integrated without any contour discontinuities, even in particularly narrow areas such as the transition zone 1.2 between well 1.1 and hump 1.3.

The transition from the well 1.1 to the hump 1.3 is influenced little by the space requirement of the connecting elements 3', so that the well 1.1, despite the large-scale connecting elements 3', can be designed space-saving with a low depth, which is associated with a favourable mass optimisation on the wheel rim 1.

At the same time, the flat-countersunk bolt 3' finished according to the invention has a homogenous full cross section, without the material-weakening auxiliary geometry, which substantially improves the force-transferring property of the connecting element 3' and ensures a particularly firm connection.

In a third process step (not shown) of the embodiment it is possible, for the purpose of sealing off the through-hole 5' through the rim base vis-à-vis the tire chamber 4, for the finished surface of the flat-countersunk head 3.2 and additionally the surface, on the outer side of the rim, of the rim base to be covered with a thin coating layer 7.

The connections can, thanks to the advantageous approach according to the invention, in addition to the method examples described, also be constructed in any other area of the rim base, for example also in the particularly narrow area of the tire seat between the hump 1.3 and the rim flange 1.4, since the connecting elements 3, 3' or the connection arrangements 8 are capable of being integrated, largely regardless of their size, into any contour section of the rim base.

LIST OF REFERENCE NUMERALS

1 Wheel rim
1.1 Well
1.2 Transition zone
1.3 Rim shoulder, hump
1.4 Rim flange
2 Wheel disc, wheel spider
3 Connecting element, flat-countersunk bolt
3.1 Flat-countersunk head of the bolt
3.1.1 Countersunk head portion of the flat-countersunk head
3.1.2 Flat-head portion of the flat-countersunk head
3.2 Flat-countersunk head of the alternative bolt
3.2.1 Countersunk head portion of the flat-countersunk head 3.2
3.2.2 Flat-head portion of the flat-countersunk head 3.2
4 Tire chamber
5 Through-hole
6 Blind hole
7 Sealant, coating layer
8 Connection arrangement
9 Two-part bushing
9.1 First bushing part
9.2 Second bushing part

What is claimed is:

1. A method for producing a vehicle wheel which comprises a connection between a wheel rim and a wheel disc, the wheel disc being connected to a rim base on an inner side of the wheel rim by at least one connecting element that is guided through a through-hole of the rim base and is incorporated into the wheel disc, wherein the method comprises incorporating the connecting element into the wheel disc in a way which leaves a portion of a head of the connecting element projecting beyond the rim base on an outer side of the rim and subsequently removing the head of the connecting element at least partially.

2. The method of claim 1, wherein the connecting element is part of a connection arrangement.

3. The method of claim 2, wherein after joining the connection arrangement in the wheel rim and the wheel disc a portion of the connection arrangement is left projecting beyond the rim base on the outer side of the rim and subsequently the connection arrangement is at least partially removed.

4. The method of claim 3, wherein the head of the connection arrangement is finished in a shaping manner, so that the connection arrangement is adapted to a contour of the rim base on the outer side of the rim to faithfully match the contour.

5. The method of claim 3, wherein the head of the connection arrangement is finished to make it level, so that the connection arrangement is at least partially flush with a contour of the rim base on the outer side of the rim or forms a recess in relation to a contour of the rim base on the outer side of the rim.

6. The method of claim 3, wherein the connection arrangement is finished by machining.

7. The method of claim 6, wherein the machining comprises one or more of turning, sanding or milling.

8. The method of claim 3, wherein a radially extending portion of the connection arrangement is at least partially let into a recess, corresponding to it in a form-fit manner, of the through-hole.

9. The method of claim 3, wherein during shape-finishing of the connection arrangement an auxiliary geometry for an installation of the connection arrangement is removed completely.

10. The method of claim 3, wherein a finished head of the connection arrangement is covered with a coating layer.

11. The method of claim 2, wherein the connection arrangement comprises a bushing.

12. The method of claim 1, wherein the head of the connecting element is finished in a shaping manner, so that the connecting element is adapted to a contour of the rim base on the outer side of the rim to faithfully match the contour.

13. The method of claim 1, wherein the head of the connecting element is finished to make it level, so that the connecting element is at least partially flush with a contour of the rim base on the outer side of the rim or forms a recess in relation to a contour of the rim base on the outer side of the rim.

14. The method of claim 1, wherein the head of the connecting element is finished by machining.

15. The method of claim 14, wherein the machining comprises one or more of turning, sanding or milling.

16. The method of claim 1, wherein the head of the connecting element is at least partially let into a recess, corresponding to it in a form-fit manner, of the through-hole.

17. The method of claim 1, wherein during shape-finishing of the head of the connecting element an auxiliary geometry for an installation of the connecting element is removed completely.

18. The method of claim 1, wherein a finished head of the connecting element is covered with a coating layer.

19. The method of claim 1, wherein the connecting element comprises an auxiliary geometry for an installation of the connecting element.

20. The method of claim 19, wherein the auxiliary geometry comprises one or more of a bar, a slot, a hexagonal socket or a differently shaped Allen recess in the connecting element.

* * * * *